United States Patent
Snyder

(10) Patent No.: US 10,125,489 B2
(45) Date of Patent: *Nov. 13, 2018

(54) SELF ADHERING WEATHER RESISTANT VAPOR PERMEABLE AIR BARRIER MEMBRANE WITH RAIN PLANE MATRIX

(71) Applicant: VAPROSHIELD, LLC, Gig Harbor, WA (US)

(72) Inventor: Leland D. Snyder, Gig Harbor, WA (US)

(73) Assignee: VAPROSHIELD, LLC, Gig Harbor, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,125

(22) Filed: Oct. 6, 2017

(65) Prior Publication Data

US 2018/0066427 A1 Mar. 8, 2018

Related U.S. Application Data

(63) Continuation-in-part of application No. 14/662,040, filed on Mar. 18, 2015, now Pat. No. 9,783,980.

(Continued)

(51) Int. Cl.
*E04C 1/00* (2006.01)
*E04B 1/62* (2006.01)
(Continued)

(52) U.S. Cl.
CPC .............. *E04B 1/625* (2013.01); *B32B 5/022* (2013.01); *B32B 5/028* (2013.01); *B32B 5/26* (2013.01); *B32B 7/06* (2013.01); *B32B 7/12* (2013.01); *B32B 27/08* (2013.01); *B32B 27/12* (2013.01); *B32B 27/32* (2013.01); *B32B 27/34* (2013.01);
(Continued)

(58) Field of Classification Search
CPC .. E04B 1/625; B32B 5/02; B32B 7/12; E04D 11/02; E04D 11/002; Y10T 428/1471
USPC ... 52/309.1, 408, 413, 309.8, 309.13, 746.1, 52/409, 416
See application file for complete search history.

(56) References Cited

U.S. PATENT DOCUMENTS 4,098,044 A 7/1978 Slavik
4,252,590 A 2/1981 Rasen et al.
(Continued)

FOREIGN PATENT DOCUMENTS

EP 0874099 10/1998

OTHER PUBLICATIONS

Irish Agrement Board, "DuPont TYVEK® SUPRO Vapour Permeable Roofing Underlays for Pitched Roofs", Certificate No. 04/0157, Nov. 2004.

(Continued)

*Primary Examiner* — Chi Q Nguyen
(74) *Attorney, Agent, or Firm* — John S. Hale; Gipple & Hale

(57) ABSTRACT

A building wrap membrane comprising a sheet of spunbonded polypropylene fabric member with integral pressure sensitive permeable adhesive coated on the back of the member and a drainage matrix secured to the front surface of the member, the drainage matrix being comprised of individual thermoplastic threads randomly laid down to form a net and secured together by heat bonding with the threads formed into spaced rows with a channel therebetween.

23 Claims, 6 Drawing Sheets

Related U.S. Application Data

(60) Provisional application No. 61/998,542, filed on Jul. 1, 2014.

(51) Int. Cl.

| | | |
|---|---|---|
| B32B 5/02 | (2006.01) | |
| B32B 5/26 | (2006.01) | |
| B32B 7/06 | (2006.01) | |
| B32B 27/12 | (2006.01) | |
| B32B 27/08 | (2006.01) | |
| B32B 27/32 | (2006.01) | |
| B32B 27/34 | (2006.01) | |
| B32B 27/36 | (2006.01) | |
| B32B 7/12 | (2006.01) | |
| E04D 11/02 | (2006.01) | |
| E04D 11/00 | (2006.01) | |

(52) U.S. Cl.
CPC .............. *B32B 27/36* (2013.01); *E04D 11/02* (2013.01); *B32B 5/02* (2013.01); *B32B 2262/0253* (2013.01); *B32B 2262/0261* (2013.01); *B32B 2307/724* (2013.01); *B32B 2307/7265* (2013.01); *B32B 2419/00* (2013.01); *E04D 11/002* (2013.01); *Y10T 428/1471* (2015.01)

(56) References Cited

U.S. PATENT DOCUMENTS

| | | | |
|---|---|---|---|
| 4,315,392 A | 2/1982 | Sylvest | |
| 4,764,412 A * | 8/1988 | Burns | B32B 27/12 428/172 |
| 4,815,963 A | 3/1989 | Berkhout | |
| 4,851,272 A | 7/1989 | Knox, III | |
| 5,099,627 A | 3/1992 | Coulton et al. | |
| 5,425,672 A | 6/1995 | Rotter | |
| 5,598,673 A | 2/1997 | Atkins | |
| 5,617,687 A | 4/1997 | Bussey, Jr. | |
| 5,960,595 A | 10/1999 | McCorsley, III et al. | |
| 6,131,353 A | 10/2000 | Egan | |
| 6,594,965 B2 | 7/2003 | Coulton | |
| 6,804,922 B1 | 10/2004 | Egan | |
| 7,488,523 B1 * | 2/2009 | Muncaster | B32B 11/04 404/17 |
| 8,146,310 B2 | 4/2012 | Keene | |
| 8,245,472 B2 | 8/2012 | Keene | |
| 8,387,336 B2 | 3/2013 | Coulton et al. | |
| 8,590,267 B2 | 11/2013 | Jaffee | |
| 9,453,337 B2 | 9/2016 | Fritz | |
| 9,783,980 B2 * | 10/2017 | Snyder | E04B 1/625 |
| 2002/0146953 A1 | 10/2002 | Lubker, II | |
| 2003/0232171 A1 * | 12/2003 | Keith | B32B 5/26 428/95 |
| 2004/0106346 A1 * | 6/2004 | Zafiroglu | B32B 3/28 442/149 |
| 2004/0180195 A1 | 9/2004 | Macuga | |
| 2005/0055983 A1 | 3/2005 | Tomes | |
| 2006/0096218 A1 | 5/2006 | Johnson | |
| 2006/0101758 A1 | 5/2006 | Egan | |
| 2008/0120935 A1 * | 5/2008 | Lembo | E04B 1/625 52/408 |
| 2009/0047465 A1 * | 2/2009 | Zafiroglu | B29C 43/222 428/97 |

OTHER PUBLICATIONS

British Board of Agrement, TYVEK® SUPRO Roof Tile Underlayment for Use in Warm Non-Ventilated and Cold Ventilated Roofs, Certificate No. 08/4548, Apr. 8, 2008.

Cosella-Dorken Products, Inc. Technical Data Sheet for DELTA®-Fassade S and DELTA®-Fassade S Plus UV, Dec. 21, 2011.

* cited by examiner

SELF ADHERING WEATHER RESISTANT VAPOR PERMEABLE AIR BARRIER MEMBRANE WITH RAIN PLANE MATRIX

RELATED APPLICATION

This is a continuation-in-part patent application claiming priority and the benefits of U.S. patent application Ser. No. 14/662,040, filed Mar. 18, 2015, issued as U.S. Pat. No. 9,783,980 on Oct. 10, 2017, claiming priority from U.S. Provisional Patent Application No. 61/998,542, filed Jul. 1, 2014.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

FIELD OF THE INVENTION

The present invention generally relates to preformed self-adhering sheet membranes used in the construction of buildings to control the movement of air and water through the building envelope, and more particularly, to an above ground air barrier, vapor permeable building underlayment sheet or membrane provided with an integral drainage matrix.

BACKGROUND OF THE INVENTION

Buildings are typically constructed with structural underlayment sheets in a spaced arrangement to cover walls and roofs. The present inventive building wrap is used to wrap the exterior surface of the building during construction. The building wrap forms an air barrier and a barrier from exterior outside water or moisture while allowing water vapor transmission from the interior of the building and water drainage through an exterior water drainage matrix. Typical wrap barrier materials include spunbonded high density polyethylene fibers, non-woven barrier material and microperforated polyethylene sheet material. Previous construction methods and materials may lead to entrapment of moisture that can result in formation of mold and mildew, wood rot and a host of other problems.

DESCRIPTION OF PRIOR ART

The prior art shows the use of sheet material having plastic threads arranged on one side to form a drain matrix. The prior art also discloses the use of adhesive strips and fasteners to secure the sheet material to building construction.

It is well known in the art to use integral adhesive strips applied to the sheet material for fastening overlaying sheets of material together. Such application of adhesive strips is disclosed by U.S. Pat. No. 8,387,336 issued Mar. 5, 2013, U.S. Patent Application Publication Number 2006/0096218 published May 11, 2006 and U.S. Patent Application Publication Number 2004/0180195 published Sep. 16, 2004. Other such uses of integral adhesive tape which have been commercially sold are WRAPSHIELD RS® by Vapro-Shield, LLC; TYVEK® SUPRO PLUS and DELTA®-FASSADE S PLUS by E. I. du Pont de Nemours and Company and Cosella-Dorken Products, Inc., respectively.

U.S. Pat. No. 8,387,336 issued Mar. 5, 2013 is directed toward a water resistive sheet having at least one pressure sensitive adhesive strip bonded to it to eliminate the need for separately applying construction tape to seal the seams.

U.S. Pat. No. 6,804,922 issued Oct. 19, 2004 is directed to a weather barrier for use in building. This building material utilizes an integral unitary member including a polymeric weather barrier, a drainage mat formed of an open, three dimensional matrix of plastic filaments formed in an overlapping irregular looped and intermingled fashion and a securement means for attaching the drainage mat to the weather barrier.

U.S. Pat. No. 6,594,965 issued Jul. 22, 2003 is directed toward an inner sheeting material with a corrugated mat of randomly convoluted polymeric filaments having undulating faces and U.S. Pat. No. 6,131,353 issued Oct. 17, 2000 discloses a weather barrier having (i) a plurality of spaced adhesive spots and (ii) a plurality of substantially parallel adhesive strips for attaching a three-dimensional matrix of overlapping loop mesh of a polyamide resin such as Nylon.

U.S. Pat. No. 5,960,595 issued Oct. 5, 1999 shows a building member having a polymeric weather barrier and a mat of an open, three dimensional matrix of plastic filaments of polyester and nylon in overlapping and randomly convoluted and intermingled fashion that are heat bonded and an adhesive securement means.

U.S. Pat. No. 5,099,627 issued Mar. 31, 1992 is directed to an openwork member constructed of a matting of individual randomly convoluted filaments made of a plastic polymeric material (such as Nylon) having a smooth side which is positioned over a roofing felt and secured to a deck member by staples through the felt.

It is further disclosed in the previous noted '627 reference that the mat is sufficiently resistant to compression so that the installer can easily feel when a shingle is pressed firmly against the mat, and drive the nail until the nail head is against the shingle, leaving the cap raised about ⅝ inch above the underlying roof shingles.

In another U.S. Pat. No. 5,425,672 issued Jun. 20, 1995, the mat material (Nylon or polyester) is provided with two lateral edge bands on each side of the roll of matting of adhesive coating to adhere or secure the matting to the roof shingles or any other planar surface.

European Patent Number 0874099 published Oct. 28, 1998 is directed to a diffusion sheet in the form of a biased undersheet for roofs. The sheet is a diffusion film layer with a web of poly directional filaments forming a loop-like inter-twined sub area seated in a foil sheet. A metal sheet or covering is shown mounted to the web. It is noted that possible applications of the product can be used with a vapor-permeable membrane such as TYVEK®.

U.S. Pat. No. 4,252,590 issued Feb. 24, 1981 is directed toward the process of making a mat of melt-spun synthetic polymer filaments laid in overlapping rows of looped and intermingled filaments to form a peak and valley three-dimensional structure underlaying on the longitudinal and transverse directions of the matting, the individual filaments being self-bonded at random points of intersection to provide transverse strength. This structure consists of open random filaments which are fused at random points of intersection.

U.S. Pat. No. 4,098,044 issued Jul. 4, 1978 discloses a sheathing board formed with longitudinal grooves to facilitate the "passage of air." It further notes that the sheathing allows free movement of air in the wall interior to relieve moisture accumulation. As indicated by the arrows on the drawings, air travels through moisture-permeable insulation, and upwardly into a series of vertical upper grooves.

SUMMARY OF THE INVENTION

The present invention is directed to a building enclosure component in the nature of vapor permeable water resistive air barrier membrane manufactured from a vapor permeable spunbonded polypropylene fabric having a permeable pressure sensitive adhesive covering the back surface of the membrane. A drainage matrix is attached to the front surface of the membrane by heat bonding and extends over the front surface of the membrane to create a drainage passageway for water.

It is an object of the invention to provide a permeable building membrane having excellent liquid water holdout and water drainage which acts as an air barrier, allowing the structure to breathe or 'dry-out as necessary, to meet the conditions of seasonal changes for each climate zone.

It is also an object of the present invention to provide a rain screen matrix integral with the membrane so that the composite membrane can be properly installed in one step and reduce installation time.

It is a further object of the invention for the incorporation of pressure sensitive adhesive coating on the back of the building membrane to increase ease of installation and eliminate tape failure and the use of mechanical fasteners.

It is still another object of the invention to reduce energy use for the life of the building.

The invention will be better understood and objects other than those set forth above will become apparent when consideration is given to the following detailed description thereof. Such description makes reference to the annexed drawings herein.

DETAILED DESCRIPTION OF THE INVENTION

Figure 1:
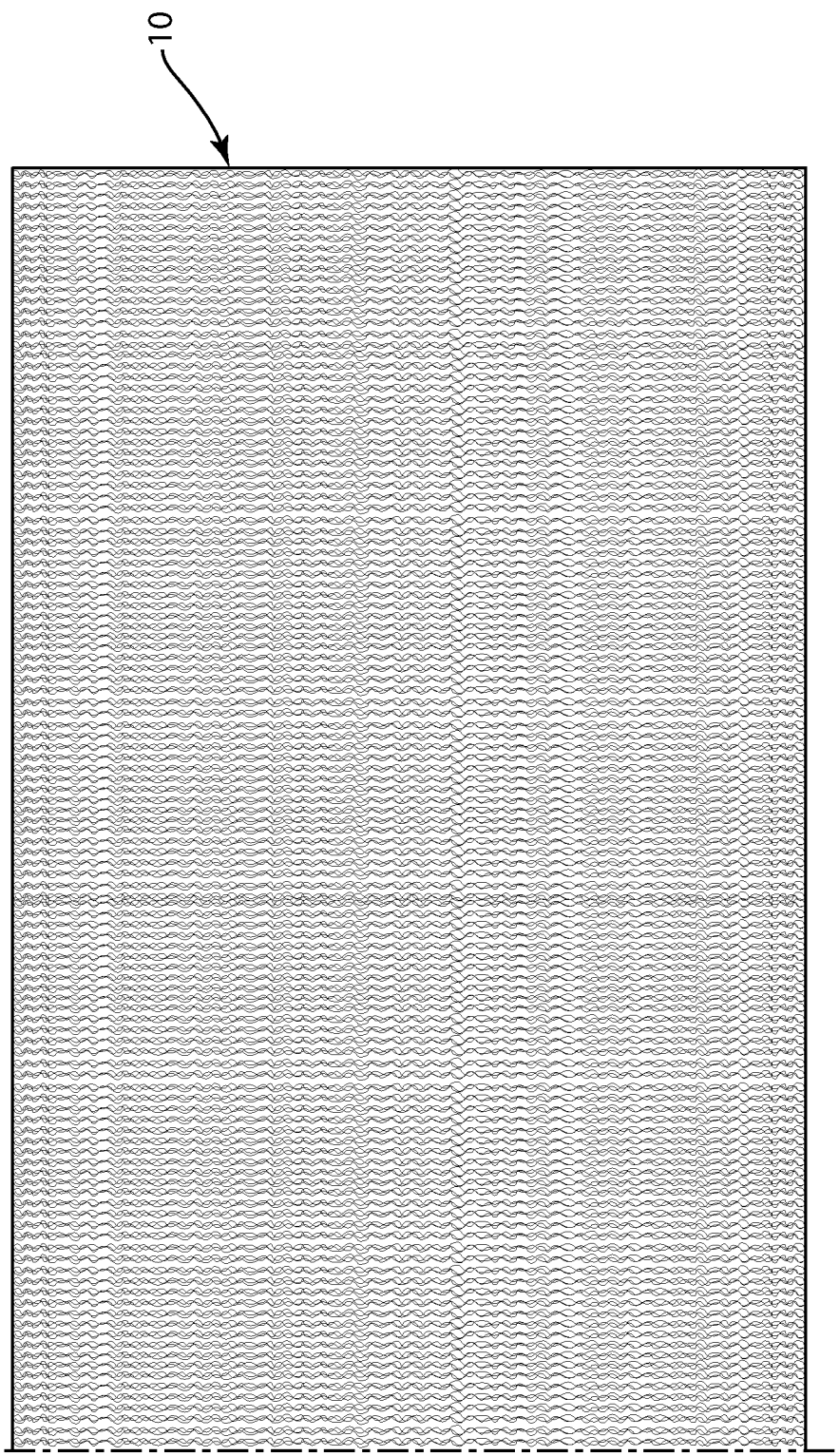
FIG. 1 is a top plan view of the building membrane in accordance with the present invention.
Figure 2:
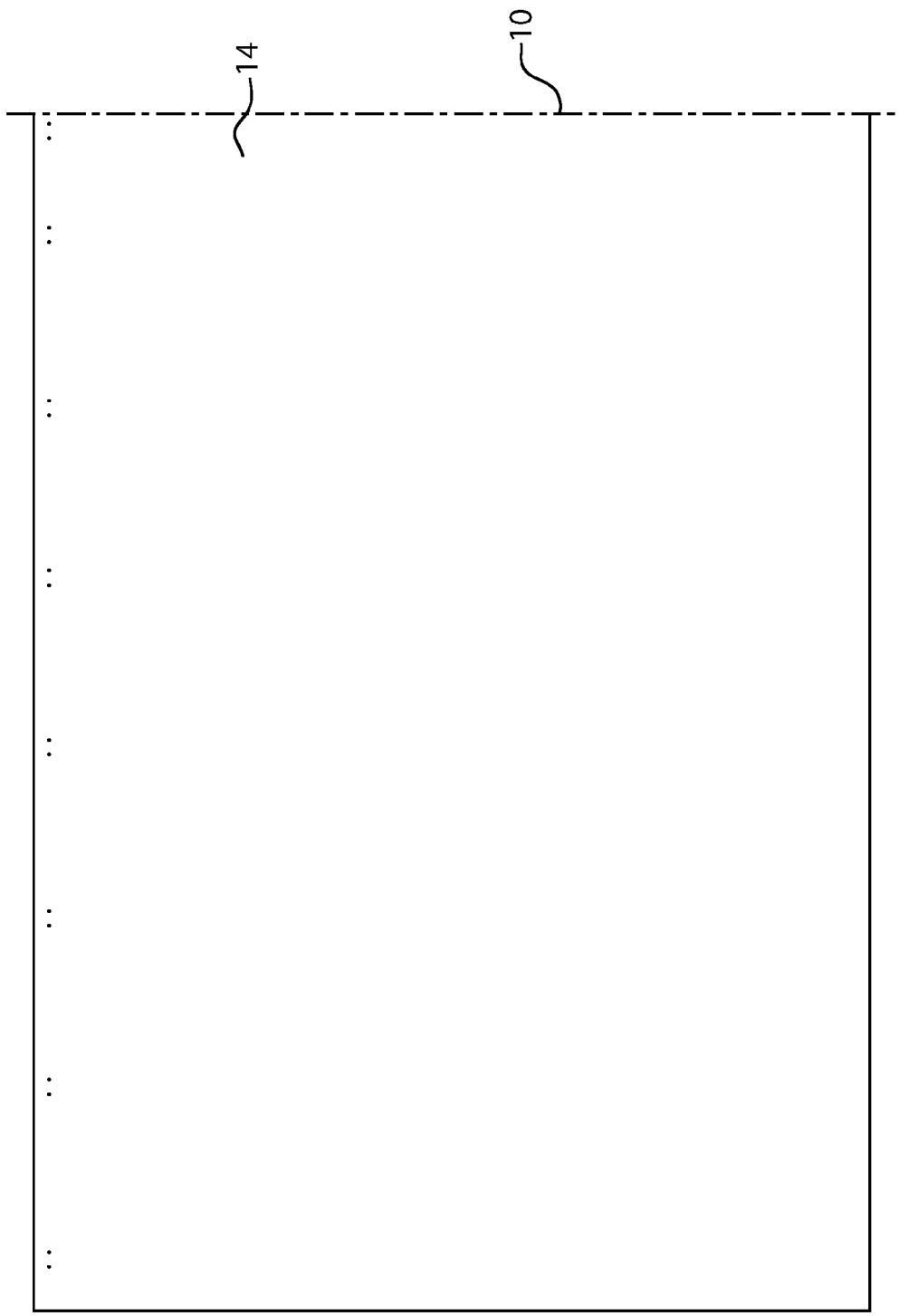
FIG. 2 is a bottom plan view of the opposite side of the building membrane shown in FIG. 1 with release sheet removed.
Figure 3:
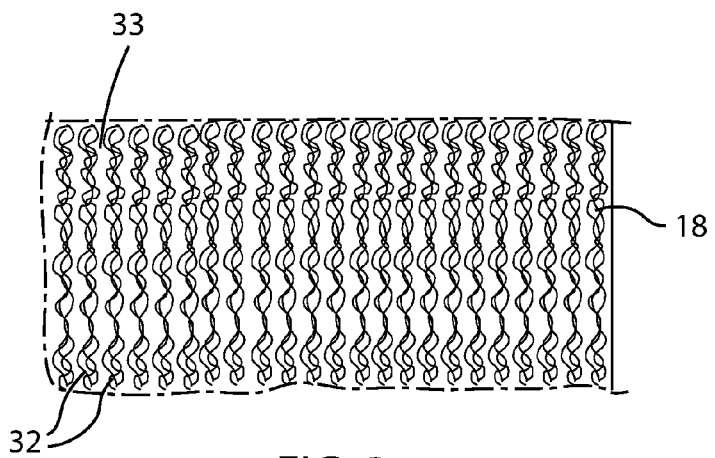
FIG. 3 is an enlarged top plan view of a portion of the building membrane drain matrix shown in FIG. 1.
Figure 4:
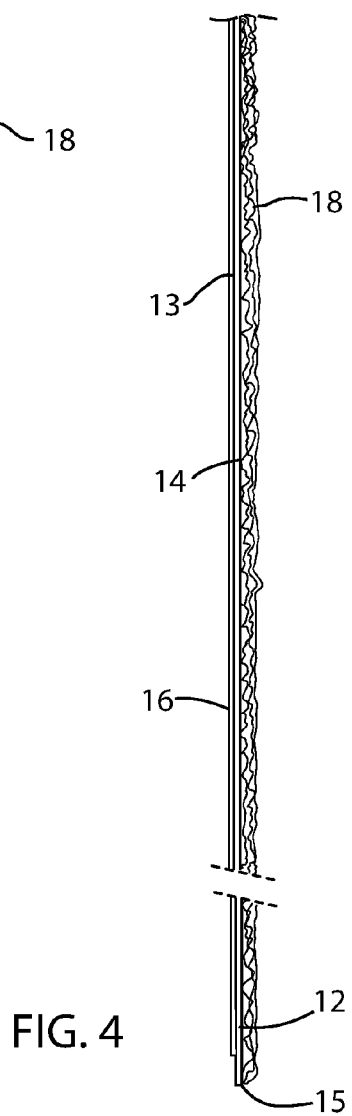
FIG. 4 is an enlarged cross sectional view of the building membrane of FIG. 1.

The preferred embodiment and best mode of the invention are shown in FIGS. 1-11. While the invention is described herein with regard to certain preferred embodiments, it is not intended that the present invention be so limited. On the contrary, it is intended to cover all alternatives, modifications, and equivalent arrangements as may be included within the spirit and scope of the invention as defined by the appended claims.

The vapor permeable membrane of the invention is a flexible sheet normally supplied in roll form for application to the outside of a building. Referring now to the drawings and the illustrative embodiments depicted therein, the building membrane 10 is constructed of a vapor permeable spunbonded polypropylene fabric member 12 with a polypropylene back surface 13. The membrane provides a continuous Type 1 air barrier and is highly permeable to water vapor while providing water resistance under AATCC 127 of 55 cm hydrostatic head of water for 5 hours. A coat of permeable pressure sensitive adhesive (PSA) 14 as applied to the back surface 13 of the membrane with a release cover liner 16 placed over the PSA on the back surface of the membrane 10 so that the membrane sheet 10 can be adhered and mounted on a building structure. The release liner is preferably a film of clear polyester ranging from about 1 mil to about 2 mils in thickness ±10% (92 gauge). The film is silicon threated on one side. When the film release cover liner 16 is pulled off of the back of the building membrane 10, the adhesive side is laid against the wall structure to be covered and pressure is applied to the membrane front surface causing the adhesive to adhere to the building structure. Random polypropylene fibers in a mat form a drainage matrix 18 which is heat bonded to the front surface 15 of the spunbonded polypropylene fabric member 12. The heat bonding forms parallel thread rows of randomly positioned thermoplastic threads 32 spaced apart by channels 33. The drainage matrix 18 covers the front surface 15 of the member 12 and sections of the drainage matrix can be cut off and removed from the matrix as desired to leave a planar top surface for roll strip overlapping.

Figure 5:
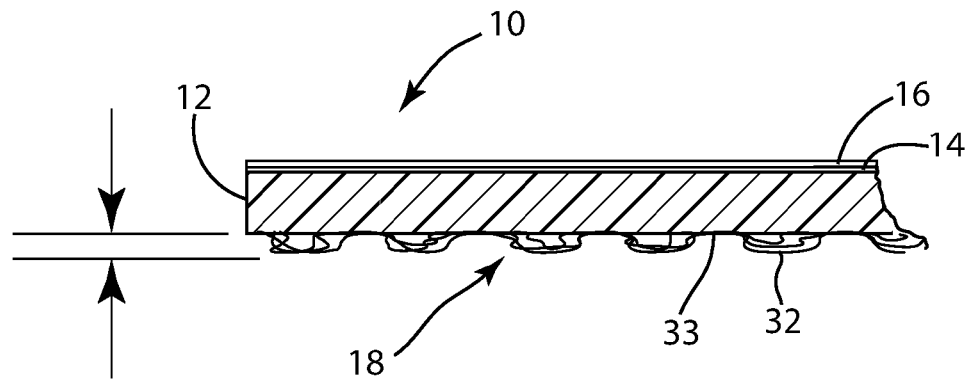
FIG. 5 is an enlarged cross sectional view of a 3 mm drain matrix shown in FIGS. 1 and 3.
Figure 6:
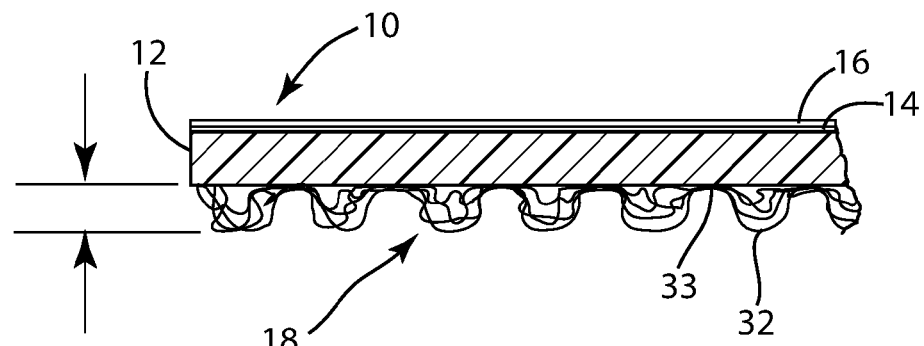
FIG. 6 is an enlarged cross sectional view of a 7 mm drain matrix embodiment.
Figure 7:
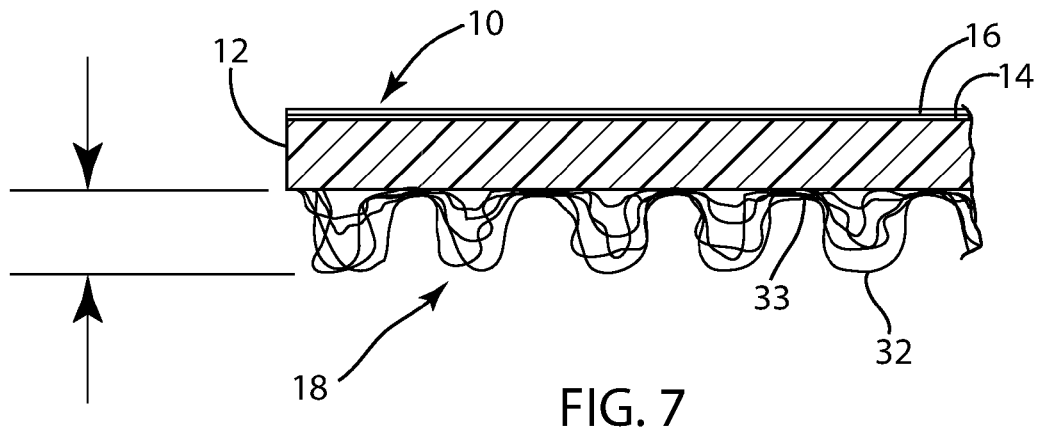
FIG. 7 is an enlarged cross sectional view of a 11 mm drain matrix embodiment.
Figure 8:
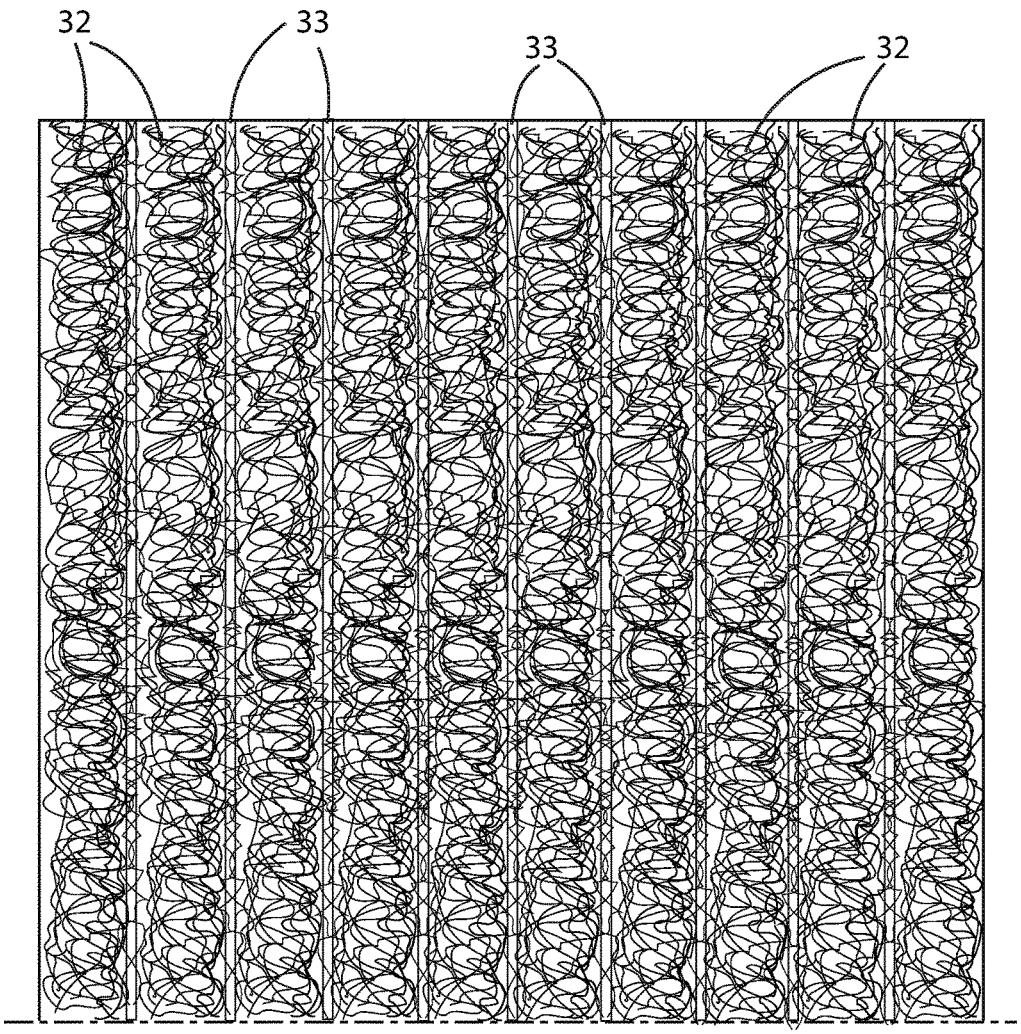
FIG. 8 is an enlarged top plan view of FIG. 5.
Figure 9:
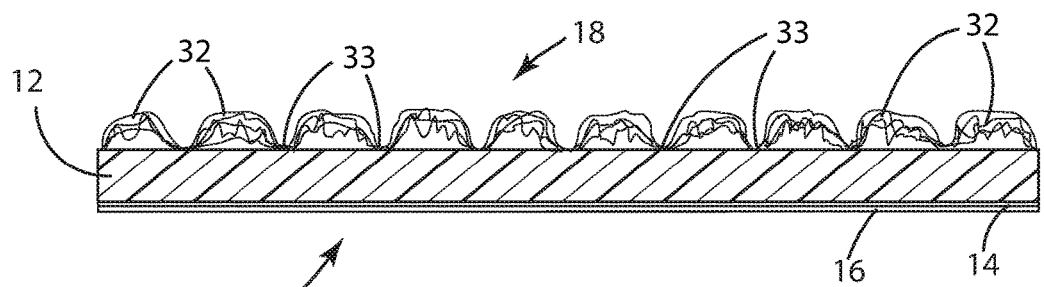
FIG. 9 is an enlarged cross sectional view of FIG. 8.
Figure 10:
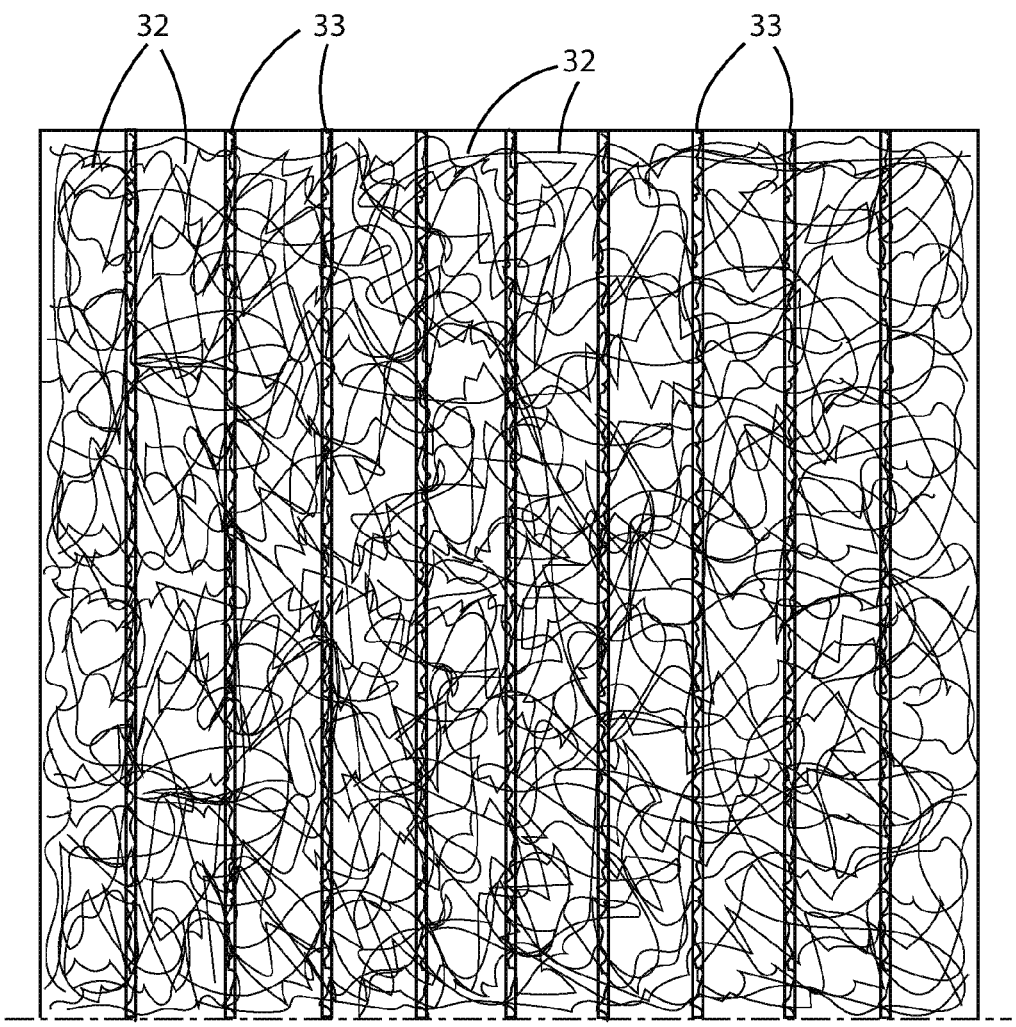
FIG. 10 is an enlarged top plan view of FIG. 7.
Figure 11:
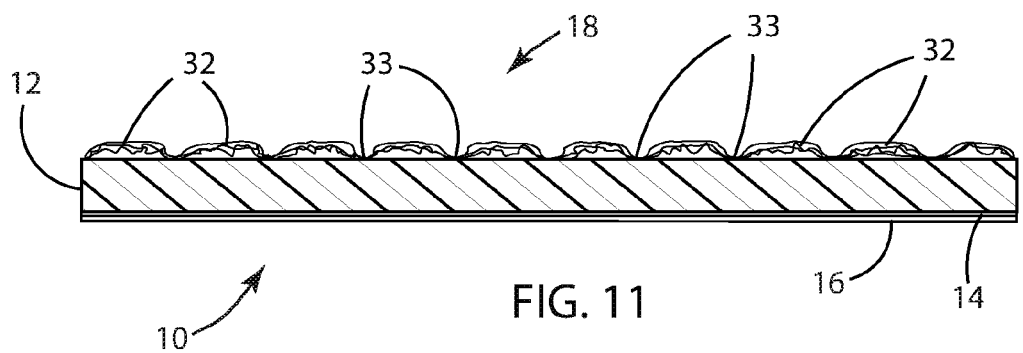
FIG. 11 is an enlarged cross sectional view of FIG. 10.

The drainage matrix 18 is available in 3 row heights, 3 mm, 7 mm and 11 mm of nominal dimension plus or minus 1 mm as shown in FIGS. 5-7 with widths between rows ranging from ½ inch to 1 inch to increase drying capacity of the building envelope. The matrix 18 thus has multiple depth drainage options. The 3 mm row height creates a minimal rain screen cavity, facilitating conventional installation of siding, trim and windows. The 7 mm and 11 mm row heights offer enhanced drainage performance for code and/or more demanding applications. The matrix 18 is spot heat bonded across the membrane width. The membrane 10 is approximately 59 inches in width and 37.5 feet in length and is shipped as rolls. The drainage matrix 18 is formed with a series of drainage rows 32 of polypropylene, Nylon or CLP plastic threads with each row being spaced apart by a channel 33 and running across the width of membrane 10. The vertical raised thread rows 32 on the matrix are separated by spaced channels 33 formed when the heated plate engages the matrix and bonds the threads to the top 15 of the membrane. The drainage rows run from about 16 to about 25 rows per linear foot, which variance is caused by the differences in matrix row height which is heat welded to the spunbonded base material 12 so that a unitary sheet of material is formed.

The present integrated rain screen vapor permeable water resistive air barrier permeable membrane with pressure sensitive adhesive can remain exposed to the elements for up to 180 days prior to installation of cladding system. The rain screen cavity created by the integrated matrix, greatly increases the drying capacity of the building envelope and the inventive material protects against water intrusion and is vapor permeable, allowing the building materials that may have become wet during the construction phase to dry out, reducing the risk of wood rot, deterioration or corrosion. The air barrier function of the system increases the energy efficiency of the building envelope, as well as prolonging the life of the structure by reducing air borne moisture loading.

As noted above, the membrane is substantially impervious to liquids such as water, but is permeable to gases such as water vapor. The integral adhesive is a vapor permeable solvent free adhesive allowing the composite membrane to have high permeability.

The pressure sensitive porous adhesive 14 is coated and cured on the back of the polyester/polyacrylic liner sheet 12 to fix the pores of the adhesive in place. The composite structure of the present invention has a high vapor permeability (30 to 50 Perms) preferably around 50 Perms and the pressure sensitive adhesive breathes allowing vapor to escape while being water resistant. This adhesive overcomes prior art adhesive strips which had little to no permeability and eliminates the need for mechanical fastening. The adhesive fully bonds to almost any substrate for air tightness and ease of installation and requires no primer.

A Perm is a unit of water vapor transmission defined as 1 grain of water vapor per square foot per hour per inch of mercury pressure difference (1 inch mercury=0.49 psi). The metric unit of measure is ng/m2 s Pa. 1 perm=55 ng/m2 s Pa. Permeability is the time rate of water vapor transmission through unit area of a material of unit thickness induced by unit vapor pressure difference between two specific surfaces, under specified temperature and humidity conditions. Membranes with a higher Perm value greater than 20 reduce the risk of condensation and promote escape of moisture through the building envelope. Additionally, membranes with a high Perm value can help building materials dry-out during the construction phase.

The copolymer portion of the pressure sensitive adhesive (PSA) preferably has a backbone consisting of n-butyl acrylate, 2-ethylhexyl acrylate, and vinyl acetate.

The pressure sensitive adhesive (PSA) is an acrylic solution and bonds to the back surface 13 of sheet 12 when it is coated on the sheet. The polymeric portion of the PSA makes up at least 95% of the adhesive formulation and has a copolymer backbone of n-butyl acrylate (about 60% by weight), 2-ethylhexyl acrylate (about 32% by weight) and vinyl acetate (about 7% by weight) forming a copolymer solvent blend capable of accepting water. Solvent is not used in the adhesive formulation so the adhesive is solvent free. The aeration process of the adhesive to achieve permeability includes high sheer mixing to entrain air in the mixed liquid solution which provides good micropore formation throughout the adhesive. Once the proper foam level is produced, the adhesive is coated on the membrane sheet, cured and the micropores formed.

The coating method used with the present invention was a blade coater. This is a non-contact coating method and it does not crush or destroy the foam during coating. It should be noted that other coating methods such as Meyer rod, comma coating and pattern bar coating were attempted but found to be detrimental to suitable micropore formation. After coating, the adhesive must be heated to cured and lock-in the micropore formation.

A majority of the pores formed by the entrained air bubbles are distributed evenly across the surface of the adhesive penetrating through the adhesive layer when the polymer mixture is heat treated to set or cure the pores in the adhesive.

The copolymer used in the PSA ranges from 45% by weight to about 50% by weight and was mixed with a solvent-free, surfactant-based wetting agent to provide emulsification and bubble size. The composition was added to water ranging from about 40% by weight to about 50% by weight and mixed in a high speed dispersion mixer at 500 rpm to form uniform bubbles in the mixture and fed into a coater noted above adhesive was coated onto the coated polyester liner sheet 12 and heat cured to form an adhesive laminate with pores in place.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A building wrap membrane comprising a flexible sheet of spun bonded vapor permeable polypropylene base sheet member, a drainage matrix is secured to a front surface of said base sheet member, said drainage matrix being constructed of individual thermoplastic threads randomly laid down and secured together by heat bonding; said thermoplastic threads being formed into parallel spaced thread rows forming channels between each spaced row, a coating of permeable pressure sensitive adhesive covers a back surface of said base sheet member and a film release sheet covers said pressure sensitive adhesive.

2. A building wrap membrane of claim 1, wherein said thermoplastic threads are nylon threads.

3. A building wrap membrane of claim 1, wherein said thermoplastic threads are polypropylene threads.

4. A building wrap membrane of claim 1, wherein each thread row has a height of about 3 mm nominal plus or minus 1 mm in height.

5. A building wrap membrane of claim 1, wherein each thread row has a height of about 7 mm nominal plus or minus 1 mm in height.

6. A building wrap membrane of claim 1, wherein each thread row height is about 11 mm nominal plus or minus 1 mm in height.

7. A building wrap membrane of claim 1, wherein said release sheet is a clear polyester film silicon treated on one side having a thickness ranging from about 1 mil to about 2 mils.

8. A building wrap membrane of claim 1, wherein said coating of permeable pressure sensitive adhesive has entrained interconnected air formed pores.

9. A building wrap membrane of claim 1, wherein said pressure sensitive adhesive comprises a water based copolymer with a backbone of n-butyl acrylate, 2-ethylhexyl acrylate, and vinyl acetate which is mixed with at least one solvent-free surfactant and is emulsified to produce air bubbles which form pores within said copolymer adhesive when the copolymer pressure sensitive adhesive is cured, said pores being uniformly distributed and interconnected throughout said pressure sensitive adhesive to form a water resistive water vapor flow path through the pressure sensitive adhesive.

10. A building wrap membrane of claim 1, wherein said pressure sensitive adhesive has a vapor permeability ranging from about 30 Perms to about 50 Perms.

11. A building wrap membrane of claim 1, wherein said drainage matrix secured to said sheet member on the said front surface of said sheet member by spot welding said drainage matrix to said sheet member and said drainage matrix is comprised of individual thermoplastic threads randomly laid down to form a net and secured together by heat bonding; said thermoplastic threads being formed into spaced rows ranging from about ½ inch to about 1 inch in width with a substantially uniform height and a uniform channel.

12. A water vapor permeable air and moisture barrier rain drainage sheet configured in sheet form that can be applied to a building wall structure comprising a sheet of spun bonded polypropylene sheet member with integral permeable pressure sensitive adhesive coated over the rear surface of said sheet member, a removable release sheet is mounted on said coated permeable pressure sensitive adhesive covering said permeable pressure sensitive adhesive, a drainage matrix is secured to said sheet member on the front surface of said sheet member, said drainage matrix being comprised of individual thermoplastic threads randomly laid down to form a fibrous mat and secured together by heat bonding; said drainage matrix being secured to said surface of said sheet member by spot welding, forming a plurality of spaced parallel thread rows ranging from about ½ inch to about 1 inch in width and defining a channel there between.

13. A building wrap membrane of claim 12, wherein said thermoplastic threads are composed of nylon threads.

14. A building wrap membrane of claim 12, wherein said thermoplastic threads are composed of polypropylene threads.

15. A building wrap membrane of claim 12, wherein each thread row has a height of about 3 mm nominal plus or minus 1 mm in height.

16. A building wrap membrane of claim 12, wherein each thread row has a height of about 7 mm nominal plus or minus 1 mm in height.

17. A building wrap membrane of claim 12, wherein each thread row height is about 11 mm nominal plus or minus 1 mm in height.

18. A building wrap membrane of claim 12, wherein said release sheet is a clear polyester film having a thickness ranging from about 1 mil to about 2 mils and silicon treated.

19. A building wrap membrane of claim 12, wherein said pressure sensitive adhesive having a vapor permeability of at least 40 Perms.

20. A building wrap membrane of claim 12, wherein said pressure sensitive adhesive having a vapor permeability ranging from about 30 Perms to about 50 Perms.

21. A building wrap membrane of claim 12, wherein said pressure sensitive adhesive comprises a water based copolymer with a backbone of n-butyl acrylate, 2-ethylhexyl acrylate, and vinyl acetate which is mixed with at least one solvent-free surfactant and is emulsified to produce air bubbles which form pores within said copolymer adhesive when the copolymer pressure sensitive adhesive is cured, said pores being uniformly distributed and interconnected throughout said pressure sensitive adhesive to form a water resistive water vapor flow path through the pressure sensitive adhesive.

22. A building wrap membrane of claim 12, wherein said pressure sensitive adhesive has a vapor permeability ranging from about 30 Perms to about 50 Perms.

23. A building wrap membrane comprising a flexible sheet of spun bonded vapor permeable polypropylene base planar member, a three dimensional drainage matrix secured by heat bonding to a front surface of said base planar member, said drainage matrix being constructed of individual convoluted thermoplastic threads randomly laid down on a front surface of said base sheet member and secured together by heat bonding; said thermoplastic threads being formed into parallel spaced thread rows forming channels between each spaced row, each row having a height ranging from between about 3 mm to about 11 mm, a coating of water soluble solvent free permeable pressure sensitive acrylic based adhesive covers a back surface of said base planar member, said building wrap membrane having a vapor permeability ranging from about 30 Perms to about 50 Perms, and a plastic film release sheet mounted over said pressure sensitive adhesive.

* * * * *